(12) United States Patent
Tsuboi et al.

(10) Patent No.: US 11,489,424 B2
(45) Date of Patent: Nov. 1, 2022

(54) SQUIRREL-CAGE INDUCTION ROTATING ELECTRICAL MACHINE, SOLID ROTOR, AND DESIGN METHOD FOR SQUIRREL-CAGE INDUCTION ROTATING ELECTRICAL MACHINE

(71) Applicant: Toshiba Mitsubishi-Electric Industrial Systems Corporation, Tokyo (JP)

(72) Inventors: Yuichi Tsuboi, Tokyo (JP); Satoshi Kurita, Tokyo (JP); Haruyuki Kometani, Tokyo (JP); Takuma Sasai, Tokyo (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 50 days.

(21) Appl. No.: 16/898,452

(22) Filed: Jun. 11, 2020

(65) Prior Publication Data
US 2020/0304001 A1 Sep. 24, 2020

Related U.S. Application Data

(63) Continuation of application No. PCT/JP2017/044493, filed on Dec. 12, 2017.

(51) Int. Cl.
*H02K 15/12* (2006.01)
*H02K 17/16* (2006.01)
(Continued)

(52) U.S. Cl.
CPC ......... *H02K 17/165* (2013.01); *H02K 5/1732* (2013.01); *H02K 15/0012* (2013.01);
(Continued)

(58) Field of Classification Search
CPC .. H02K 17/16; H02K 2205/12; H02K 17/165; H02K 21/12; H02K 15/00; Y10T 29/49009
See application file for complete search history.

(56) References Cited

U.S. PATENT DOCUMENTS

| | | | |
|---|---|---|---|
| 4,370,582 A * | 1/1983 | Addicott | H02K 17/16 310/211 |
| 4,644,210 A | 2/1987 | Meisner et al. | |

(Continued)

FOREIGN PATENT DOCUMENTS

| | | |
|---|---|---|
| CN | 102545505 A | 7/2012 |
| CN | 105743242 A | 7/2016 |

(Continued)

OTHER PUBLICATIONS

International Search Report and Written Opinion dated Feb. 27, 2018 for PCT/JP2017/044493 filed on Dec. 12, 2017, 10 pages including English Translation of the International Search Report.

(Continued)

*Primary Examiner* — Leda T Pham
(74) *Attorney, Agent, or Firm* — Xsensus LLP

(57) ABSTRACT

A squirrel-cage induction rotating electrical machine comprises: a solid rotor, a stator, and bearings. The solid rotor includes a shaft part, a columnar-shaped rotor core part integrally formed with the shaft part and having rotor slots formed therein, and a plurality of conductor bars passing through the respective rotor slots and coupled together at both axial ends outside the rotor core part. The stator includes a cylindrical stator core provided radially outside the rotor core part, and stator windings passing through a plurality of respective stator slots which are formed in the radially inner surface of the stator core. An outer wall and an inner wall of each rotor slot are tilted at a predetermined (Continued)

angle or more with respect to a plane including a rotation axis of the shaft part.

1 Claim, 13 Drawing Sheets

(51) Int. Cl.
H02K 5/173 (2006.01)
H02K 15/00 (2006.01)
H02K 11/25 (2016.01)
H02K 7/00 (2006.01)

(52) U.S. Cl.
CPC .............. *H02K 7/003* (2013.01); *H02K 11/25* (2016.01); *H02K 2213/09* (2013.01)

(56) References Cited

U.S. PATENT DOCUMENTS

| | | | | |
|---|---|---|---|---|
| 4,831,301 | A | * | 5/1989 | Neumann ................ H02K 1/16 310/184 |
| 6,933,647 | B2 | * | 8/2005 | Kuemmlee .......... H02K 17/165 310/211 |
| 8,692,435 | B2 | | 4/2014 | Sawahata et al. |
| 9,806,589 | B2 | * | 10/2017 | Komatsu .............. H02K 17/165 |
| 2003/0011266 | A1 | | 1/2003 | Morita et al. |
| 2012/0091850 | A1 | * | 4/2012 | Sawahata ............. H02K 17/165 310/211 |
| 2012/0159983 | A1 | | 6/2012 | Tsutsumi et al. |
| 2017/0047802 | A1 | * | 2/2017 | Yabe ...................... H02K 17/16 |

FOREIGN PATENT DOCUMENTS

| | | | |
|---|---|---|---|
| EP | 2 403 116 | A1 | 1/2012 |
| JP | 6-335209 | A | 12/1994 |
| JP | 7-46807 | A | 2/1995 |
| JP | 2003-9483 | A | 1/2003 |
| JP | 3752781 | B2 | 3/2006 |
| JP | 2012-085477 | A | 4/2012 |
| JP | 5557685 | B2 | 7/2014 |
| JP | 2014-195374 | A | 10/2014 |
| JP | 2015-112011 | A | 6/2015 |
| JP | 2016-36193 | A | 3/2016 |
| JP | 2016-123252 | A | 7/2016 |
| JP | 2016-220404 | A | 12/2016 |
| JP | 2017-127083 | A | 7/2017 |
| WO | 97/45942 | A1 | 12/1997 |

OTHER PUBLICATIONS

Extended European Search Report dated Jun. 24, 2021, in corresponding European Patent Application No. 17934525.1.
Chinese Office Action dated Jan. 21, 2022, in corresponding Chinese Patent Application No. 201780097645.3.

* cited by examiner

Circumferential flux
density distribution

Circumferential flux
density distribution

Circumferential flux density distribution

SQUIRREL-CAGE INDUCTION ROTATING ELECTRICAL MACHINE, SOLID ROTOR, AND DESIGN METHOD FOR SQUIRREL-CAGE INDUCTION ROTATING ELECTRICAL MACHINE

CROSS-REFERENCE TO RELATED APPLICATION

The present application is a bypass continuation of PCT filing PCT/JP2017/044493, filed Dec. 12, 2017, the entire content of which is incorporated herein by reference.

FIELD

The present invention relates to a squirrel-cage induction rotating electrical machine, a solid rotor, and a design method for a squirrel-cage induction rotating electrical machine.

BACKGROUND

An induction rotating electrical machine has an advantage of having a simpler structure compared to a synchronous rotating electrical machine, although having limitations such as inability of making power factor adjustment as the synchronous rotating electrical machine does. The induction rotating electrical machine is typically classified into a winding induction rotating electrical machine and a squirrel-cage induction rotating electrical machine. The squirrel-cage induction rotating electrical machine does not require electrical connection to an external device unlike the winding induction rotating electrical machine and has a simpler structure than the winding induction rotating electrical machine. In particular, the squirrel-cage induction rotating electrical machine can be easily controlled from a power source side due to improvement in performance of a power semiconductor, and thus a system combining the squirrel-cage induction rotating electrical machine and power semiconductor is widely used.

In the squirrel-cage induction rotating electrical machine, a plurality of rotor slots are formed in the vicinity of the radial surface of the rotor core so as to be disposed with circumferential intervals therebetween and to axially penetrate the rotor core. Conductor bars pass through the respective rotor slots and are electrically coupled together by a short-circuit ring disposed at axially outside the rotor core. The rotor slots are formed so as to extend from the surface of the rotor core toward the rotation center axis thereof and each have a cross-sectional shape close to, for example, a rectangle as shown in Japanese Patent Application Laid-Open Publication No. 2016-220404 or an oval as shown in Japanese Patent No. 3752781.

In some cases, the conductor bars and the short-circuit ring are integrally formed of aluminum by casting as shown in Japanese Patent Application Laid-Open Publication No. 2014-195374.

A rotor is typically composed of a rotor shaft and a rotor core formed by laminated plates that is attached to radially outside the rotor shaft. In this configuration, the laminated plates are electrically insulated from one another, so that axial eddy current does not occur. In the squirrel-cage induction rotating electrical machine having a rotor core formed by laminated plates, heat generation at the conductor bars of the rotor is suppressed to reduce heat generation across the rotor as shown in Japanese Patent No. 5557685.

A high-speed machine operating at a high speed sometimes employs a solid magnetic pole type rotor (solid rotor) integrally having a rotor core and a rotor shaft for the purpose of enhancing its mechanical strength. In such high speed, an increased centrifugal force acts on the conductor bars, so that it is necessary to reliably prevent the conductor bars from coming off radially outward. The direction of the centrifugal force coincides with a direction in which each slot extends, so that, for example, the conductor bars are each brought into pressure contact with the rotor core for the prevention of coming-off as shown in U.S. Pat. No. 6,933,647.

The solid rotor has a simpler structure than a rotor having a laminated structure and is thus excellent in mechanical strength; however, axial eddy current occurs in the solid rotor, producing a larger loss than the rotor having a laminated structure. This disadvantageously increases the temperature of the surface of the rotor core.

DETAILED DESCRIPTION

Figure 1:
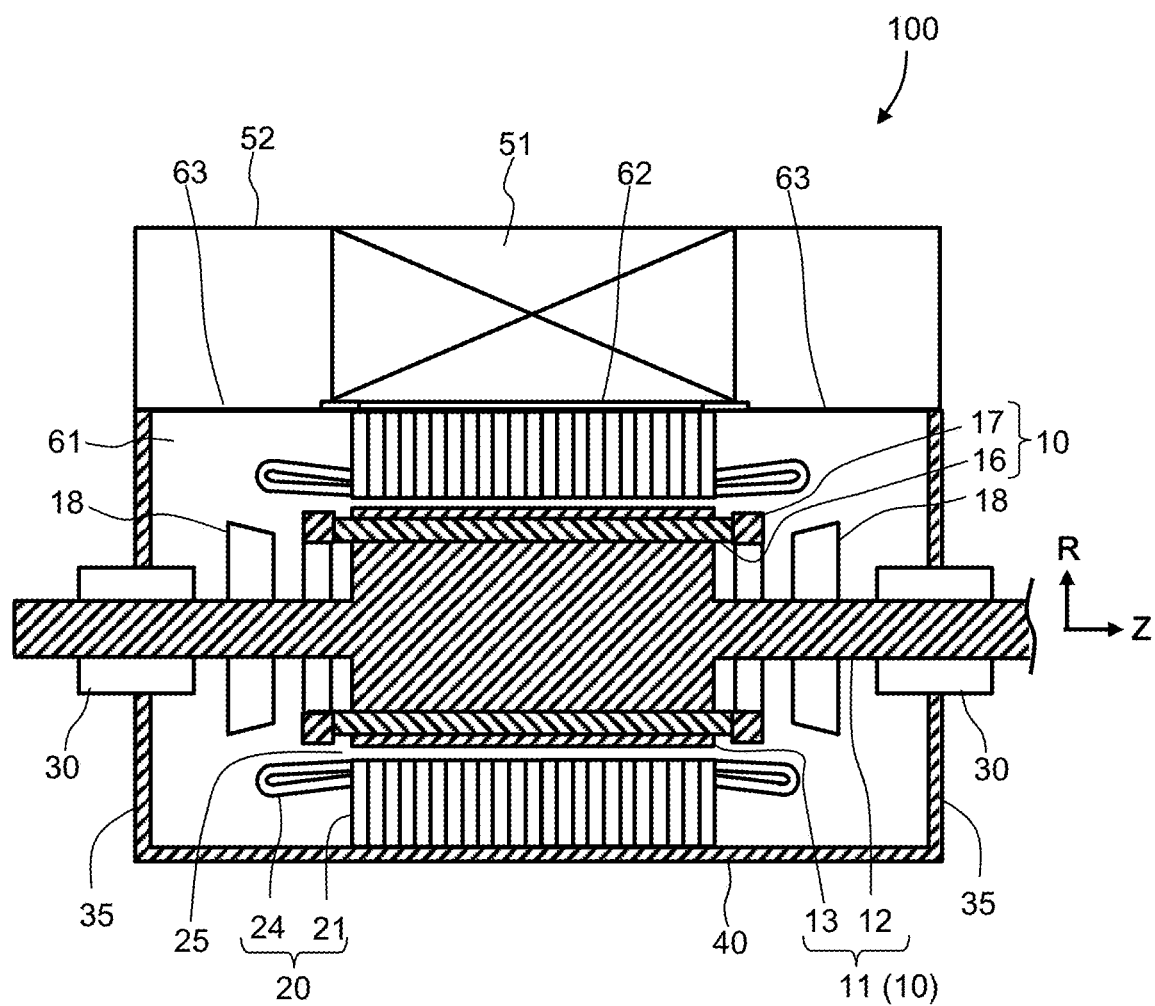
FIG. 1 is an elevation sectional view illustrating the configuration of a squirrel-cage induction rotating electrical machine according to an embodiment.

An object of the present invention is therefore to secure preventing the conductor bars from coming off radially outward and to suppress surface temperature rise in the squirrel-cage induction rotating electrical machine having a solid rotor.

According to the present invention, there is provided a squirrel-cage induction rotating electrical machine comprising: a solid rotor extending axially and supported rotatably, including a shaft part and a columnar-shaped rotor core part integrally formed with the shaft part, the columnar-shaped rotor core part having a diameter larger than that of the shaft part and having rotor slots formed therein which are disposed with circumferential intervals therebetween and extend axially, and a plurality of conductor bars passing through the respective rotor slots and coupled together at both axial ends outside the rotor core part; a stator having a cylindrical stator core provided radially outside the rotor core part and stator windings passing through a plurality of respective stator slots which are formed in the radially inner surface of the stator core so as to be disposed with circumferential intervals therebetween and to extend axially; and two bearings supporting the solid rotor at both axial sides of the shaft part, sandwiching the rotor core part, wherein two opposing walls of each rotor slot are circumferentially tilted at a predetermined angle or more with respect to a plane including a rotation axis of the shaft part.

According to the present invention, there is provided a solid rotor used for a squirrel-cage induction rotating electrical machine, comprising: a shaft part extending axially and supported rotatably; a columnar-shaped rotor core part integrally formed with the shaft part, having a diameter larger than that of the shaft part, and having formed therein rotor slots which are disposed with circumferential intervals therebetween and extend axially; and a plurality of conductor bars passing through the respective rotor slots and coupled together at both ends outside the rotor core part, wherein two opposing walls of each rotor slot are circumferentially tilted at a predetermined angle or more with respect to a plane including a rotational axis of the shaft part.

According to the present invention, there is provided a design method for a squirrel-cage induction rotating electrical machine provided with a solid rotor having a shaft part and a rotor core part which are integrally formed and a stator provided radially outside the rotor core part, comprising: a stator condition setting step of setting dimensions and arrangement pitch of a plurality of stator slots which are formed in the radially inner surface of the stator so as to be disposed with circumferential intervals therebetween and to extend axially; a rotor condition setting step of setting, after the stator condition setting step, dimensions and arrangement pitch of rotor slots which are formed in the radially outer surface of the rotor core part so as to be disposed with circumferential intervals therebetween and to penetrate axially the rotor core part; a tilt angle setting step of setting a circumferential tilt angle of the rotor slot after the rotor condition setting step; a stress calculation step of calculating stress of the rotor core part after the tilt angle setting step; a temperature calculation step of calculating temperature of the rotor core part after the tilt angle setting step; an angle range determination step of determining whether processing for examining the circumferential tilt angle of the rotor slot is completed over the entire examination target range and performing the tilt angle setting step and subsequent steps when the determination is negative; a pitch range determination step of determining whether processing for examining the arrangement pitch of the rotor slots is completed over the entire examination target range when the determination in the angle range determination step is positive and performing the rotor condition setting step and subsequent steps when the determination in this pitch range determination step is negative; and a determination step of determining the tilt angle and pitch of the rotor slots based on results of the stress calculation step and temperature calculation step when the determination in the pitch range determination step is positive.

Embodiments for Carrying Out the Invention

Embodiments of a squirrel-cage induction rotating electrical machine, a solid rotor, and a design method for a squirrel-cage induction rotating electrical machine according to the present invention will be described with reference to the drawings. Throughout the description, the same reference numerals are given to the same or similar parts, and repeated description will be omitted.

FIG. 1 is an elevation sectional view illustrating the configuration of a squirrel-cage induction rotating electrical machine according to an embodiment.

A squirrel-cage induction rotating electrical machine 100 includes a solid rotor 10, a stator 20, bearings 30, a frame 40, and a cooler 51.

The solid rotor 10 is a solid magnetic pole type rotor integrally having a rotor core and a rotor shaft for securing its mechanical strength and includes an integral rotor 11, a plurality of conductor bars 16, and two short-circuit rings 17.

The integral rotor 11 is a rotationally symmetric body and has a shape combining columns having different diameters along the rotation axis direction, which is hereinafter also expressed simply by the term "axial direction", "axial", or "axially". A larger-diameter column at the axial center part of the integral rotor 11 constitutes a rotor core part 13. A smaller-diameter part at each axial side of the rotor core part 13 constitutes a shaft part 12. The shaft part 12 is rotatably supported at both axial sides by the bearings 30. Internal fans 18 are attached to the shaft part 12 at positions between the rotor core part 13 and the two bearings 30.

The plurality of conductor bars 16 axially extend through the vicinity of the radial surface of the rotor core part 13, as described later. The conductor bars 16 axially protrude from both sides of the rotor core part 13 by the same length. Each of the end portions of each conductor bar 16 are electrically and mechanically coupled to the short-circuit ring 17 provided at each axially outer sides from the rotor core part 13, whereby the plurality of conductor bars 16 are mutually electrically coupled. The conductor bar 16 and short-circuit ring 17 are each made of a material having a conductivity higher than that of the rotor core part 13. For example, the rotor core part 13 is made of, for example, steel or low-alloy steel, while the conductor bar 16 and short-circuit ring 17 are each made of, for example, copper or aluminum.

The stator 20 includes a stator core 21 and a plurality of stator windings 24. The stator core 21 is disposed radially outside the rotor core part 13 of the solid rotor 10 via a annular gap 25 therebetween. The stator core 21 has a hollow cylindrical shape, and the stator windings 24 penetrate the vicinity of the inner surface of the stator core 21.

The frame 40 houses the stator 20 and the rotor core part 13. Bearing brackets 35 are fixed at both axial ends of the frame 40. Each of the bearing brackets 35 stationarily support each corresponding bearing 30.

The cooler 51 is disposed above the frame 40 and is surrounded by a cooler cover 52. The cooler cover 52 forms a closed space 61 together with the frame 40 and the two bearing brackets 35. The closed space 61 is filled with cooling gas, such as air, which is driven by the internal fan 18 to circulate in the closed space 61. A space within the cooler cover 52 and a space within the frame 40, which form the closed space 61, communicate with each other through a cooler inlet opening 62 formed above the stator 20 and each cooler outlet opening 63 formed above each internal fan 18.

Figure 2:
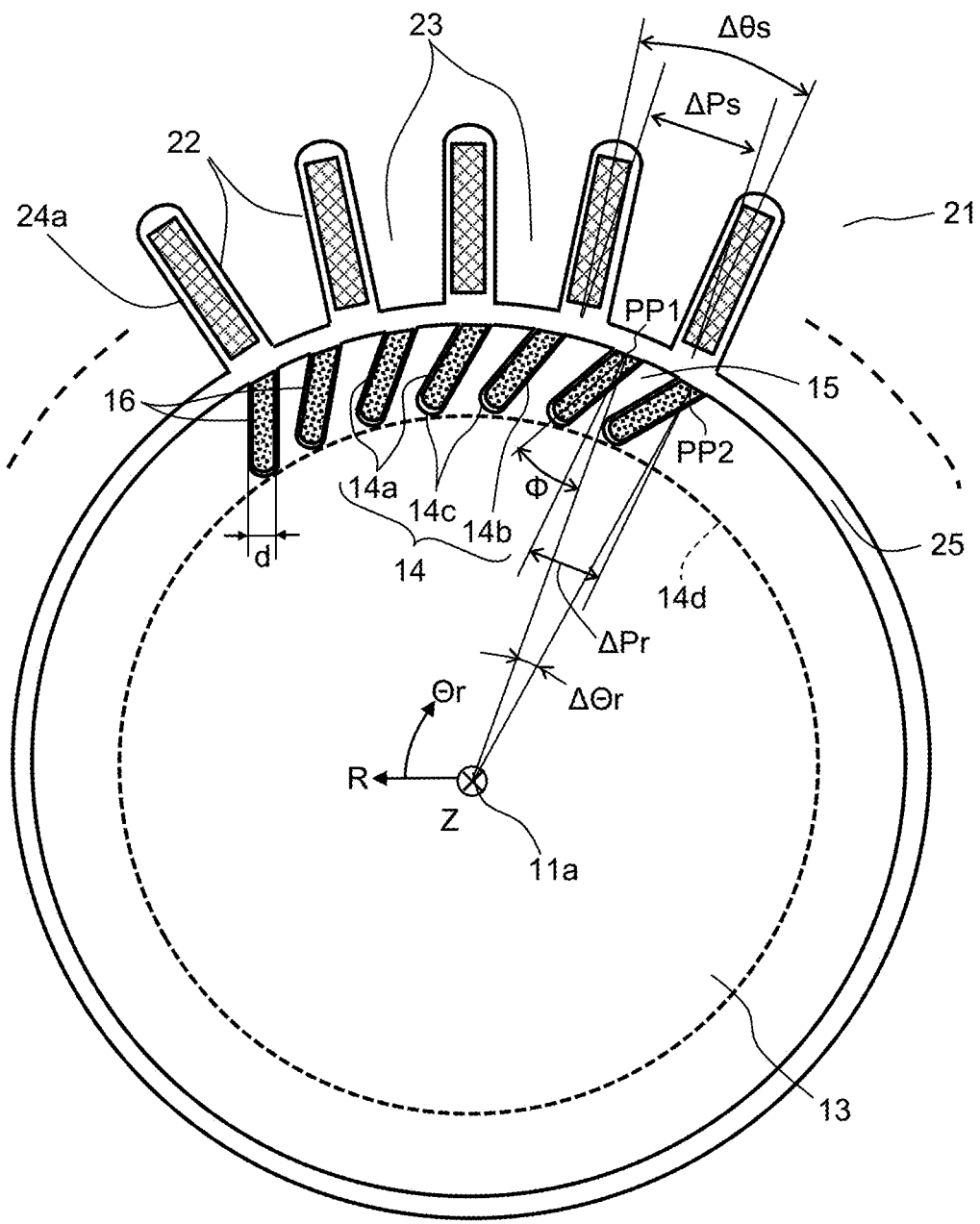
FIG. 2 is a cross-sectional view illustrating a solid rotor and stator slots of the squirrel-cage induction rotating electrical machine according to the embodiment.

FIG. 2 is a cross-sectional view illustrating a solid rotor and stator slots of the squirrel-cage induction rotating electrical machine according to the embodiment.

A plurality of groove-like rotor slots 14 each having a width d are formed in the surface of the rotor core part 13 so as to be disposed with circumferential intervals therebetween and to extend axially. The conductor bar 16 passes through each rotor slot 14. The rotor slot 14 has an outer wall 14a, an inner wall 14b, and a radially innermost wall 14c which axially extend. The outer wall 14a and the inner wall 14b are formed in parallel to each other. The innermost wall 14c has a curved shape in cross section of the rotor slot 14. The rotor slot 14 radially extends to the depth of an inscribed circle 14d.

The conductor bar 16 and the rotor slot 14 have substantially the same shape and cross-sectional dimensions. The conductor bar 16 has a flat-plate shape elongating axially. The conductor bar 16 can be fitted into the rotor slot 14 from radially outside the rotor slot 14. To prevent the conductor bar 16 from coming off the rotor slot 14, for example, a silver brazing foil may be wound around the conductor bar 16 so as to cover its parts opposite to the outer wall 14a, inner wall 14b, and innermost wall 14c, and then the resultant conductor bar 16 is inserted into the rotor slot 14, followed by melting of the silver brazing foil. Alternatively, TIG welding may be applied from outside after the conductor bar 16 is inserted into the rotor slot 14, or the conductor bar 16 that has been inserted into the rotor slot 14 and the rotor slot 14 may be brought into pressure contact with each other.

The radially outer end portion of the conductor bar 16 is flush with the radially outer surface of the rotor core part 13 forming a cylindrical shape. Alternatively, the radially outer end portion of the conductor bar 16 may be partially retracted radially inward from the surface of the cylinder by, for example, forming the radially outer end portion of the conductor bar 16 perpendicular to the flat surface of the outer and inner walls 14a and 14b.

In the above description, the case in which the conductor bar 16 is fitted into the rotor slot 14 from radially outside the rotor slot 14 is exemplified; however, the conductor bar 16 may be inserted from an axially end portion of the rotor core part 13. In this case, the conductor bar 16 can be formed in a shape other than the flat-plate shape. For example, a maximum thickness portion or a minimum thickness portion may be formed in the axially middle portion of the conductor bar 16 so as to resist the centrifugal force.

The rotor slot 14 does not extend along the radial direction from the rotation center but is circumferentially tilted with respect to the radial direction. This will be described in detail later using FIG. 10. Since the rotor slots 14 are thus formed, rotor teeth 15 as many as the number of the rotor slots 14 are formed so as to be disposed with circumferential intervals therebetween.

A plurality of groove-like stator slots 22 are formed so as to be disposed with circumferential intervals and to extend axially in radially inner surface of the stator core 21 disposed radially outside the rotor core part 13 via the gap 25. As a result, stator teeth 23 as many as the number of the stator slots 22 are provided so as to be circumferentially spaced from one another. The direction of the stator teeth 23 is defined such that the center plane between opposing side walls of each stator slot 22 passes the center axis of the solid rotor 10. A stator winding conductor 24a passes through each stator slot 22 to constitute the stator winding 24.

Hereinafter, circumferential tilt angle Φ and arrangement pitch of the rotor slots 14 and the arrangement pitch of the stator slots 22 will be described.

The circumferential tilt angle Φ of the rotor slot 14 is defined, in the cross section perpendicular to the axial direction illustrated in FIG. 2, as an angle formed by a line connecting an point PP1, which is an intersection between the widthwise center line of the rotor slot 14 and the circumscribed circle of the solid rotor 10, and a rotation center axis 11a of the rotor core part 13, and the widthwise center line of the rotor slot 14. Conventionally, that angle Φ is set to zero, while in the present embodiment, the angle Φ is set to a value larger than 0. That is, the rotor slot 14 is tilted with respect to the line connecting the intersection point PP1 and the rotation center axis 11a.

The arrangement pitch of the rotor slots 14 can be defined in various ways. Specifically, as illustrated in FIG. 2, the cross section perpendicular to the axial direction, the arrangement pitch may be defined by a circumferential angle interval Δθr formed by points PP1 and PP2 on the solid rotor 10 or by an interval ΔPr between the points PP1 and PP2. Further, although not illustrated, the arrangement pitch may be defined by an interval between the points PP1 and PP2 on the circumference of the circumscribed circle of the rotor core part 13. When the diameter of the rotor core part 13, i.e., the diameter of the circumscribed circle of the rotor core part 13 is determined, the circumferential angle interval Δθr and interval ΔPr defining the arrangement pitch of the rotor slots 14 one-to-one correspond to each other and, further, they also one-to-one correspond to the number of the rotor slots.

Similarly, the arrangement pitch of the stator slots 22 may be defined by a circumferential angle interval Δθs or by an interval ΔPs, as illustrated in FIG. 2. When the dimensions of the stator core 21 are determined, the circumferential angle interval Δθs and the interval ΔPs one-to-one correspond to each other and, further, they also one-to-one correspond to the number of the stator slots.

Hereinafter, the arrangement pitch of the rotor slots 14 or arrangement pitch of the stator slot 22 is assumed to be determined by any of the above definitions.

Figure 3:
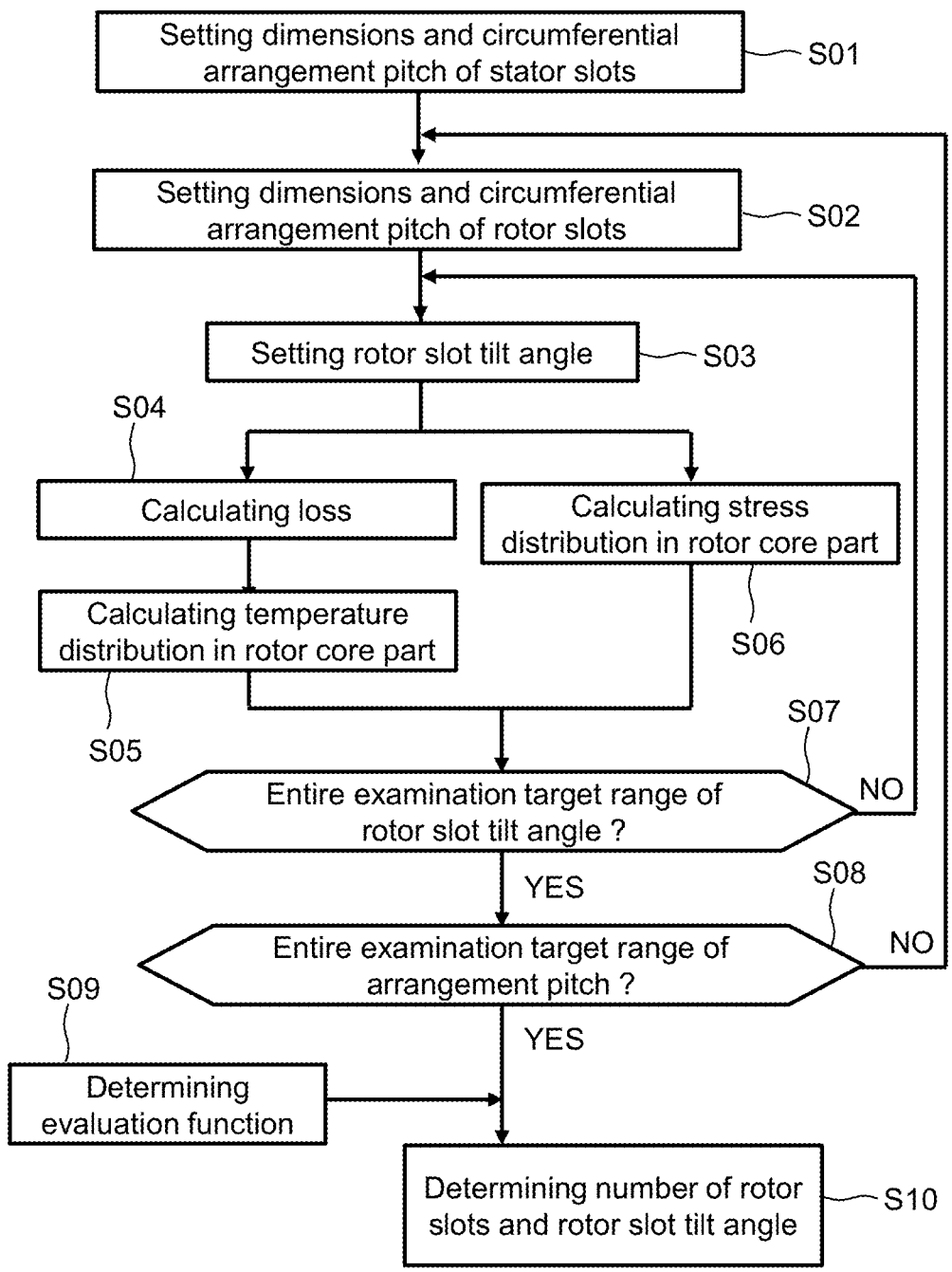
FIG. 3 is a flowchart illustrating the procedure of a design method for the solid rotor of the squirrel-cage induction rotating electrical machine according to the embodiment.

FIG. 3 is a flowchart illustrating the procedure of a design method for the solid rotor of the squirrel-cage induction rotating electrical machine according to the embodiment. More specifically, the flowchart of FIG. 3 illustrates the procedure of a design method for determining an optimum range of the circumferential tilt angle Φ (hereinafter, referred to as "rotor slot tilt angle Φ") of the rotor slot 14.

First, design conditions for the stator slots 22 (e.g., dimensions and circumferential arrangement pitch of the stator slots 22) are set (step S01). The dimension of the stator winding conductor 24a passing through each stator slot 22 is set in accordance with the set design conditions for the stator slots 22.

Then, design conditions for the rotor slots 14 (e.g., dimensions and circumferential arrangement pitch of the rotor slots 14) are set (step S02).

Then, the rotor slot tilt angle Φ is set (step S03). The dimensions and shape of the conductor bar 16 passing through each rotor slot 14 are set in accordance with the set design conditions for the rotor slots 14.

Design conditions other than those for the rotor slots 14 and the stator slots 22, such as the dimensions of the solid rotor 10, the stator 20, and the gap 25, are assumed to be preset.

After the design conditions for the rotor slots 14 and the stator slots 22 are thus determined, a loss in the rotor core part 13 of the solid rotor 10 is calculated (step S04). Subsequently, temperature distribution in the rotor core part 13 is calculated based on the determined loss (step S05).

Further, stress distribution in the rotor core part 13 is calculated in parallel with the temperature calculation in steps S04 and S05 (step S06).

Then, it is determined whether the procedure up to step S06 is completed over the entire examination target range of the rotor slot tilt angle Φ (step S07). Assuming here that the examination target range of the rotor slot tilt angle Φ is from Φsmin to Φsmax, Φsmin is an angle larger than 0°, and Φsmax is an angle smaller than 90°. For example, the examination target range may be wide to some extent (e.g., in a range from 10° to 80°) or may be narrower.

When the determination in step S07 is NO, the procedure returns to step S03, and the procedure up to step S06 is performed after changing the rotor slot tilt angle Φ to another value.

When the determination in step S07 is YES, it is determined whether the procedure up to step S06 is completed over the entire examination target range of the arrangement pitch of the rotor slots 14 (step S08). When the determination in step S08 is NO, the procedure returns to step S02, and the procedure up to step S06 is performed after changing the arrangement pitch of the rotor slot 14 to another value.

When the determination in step S08 is YES, the procedure proceeds to step S10.

An evaluation function is determined before step S10 (step S09). The evaluation function is, for example, an evaluation function PI (n) represented by the following equations (2) and (3) for minimizing overall generated stress and loss regarding the number n of the rotor slots, or an evaluation function PI (Φ, $n_0$) represented by the following equation (4) for minimizing overall generated stress and loss.

Then, the number n of the rotor slots 14 and rotor slot tilt angle Φ are determined based on the evaluation function set in step S09 (step S10).

While the procedure of the design method for the solid rotor illustrated in FIG. 3 has been described briefly, the procedure in step S02 to step S08 is a survey performed for a predetermined examination target range of the rotor slot tilt angle Φ and a predetermined examination target range of the arrangement pitch of the rotor slots 14 or of the number n of the rotor slots corresponding to the arrangement pitch. Actually, the number n of the rotor slots 14 and rotor slot tilt angle Φ are determined in step S09 and step S10 based on results of the survey. The following describes the processing in step S09 and step S10.

Figure 4:
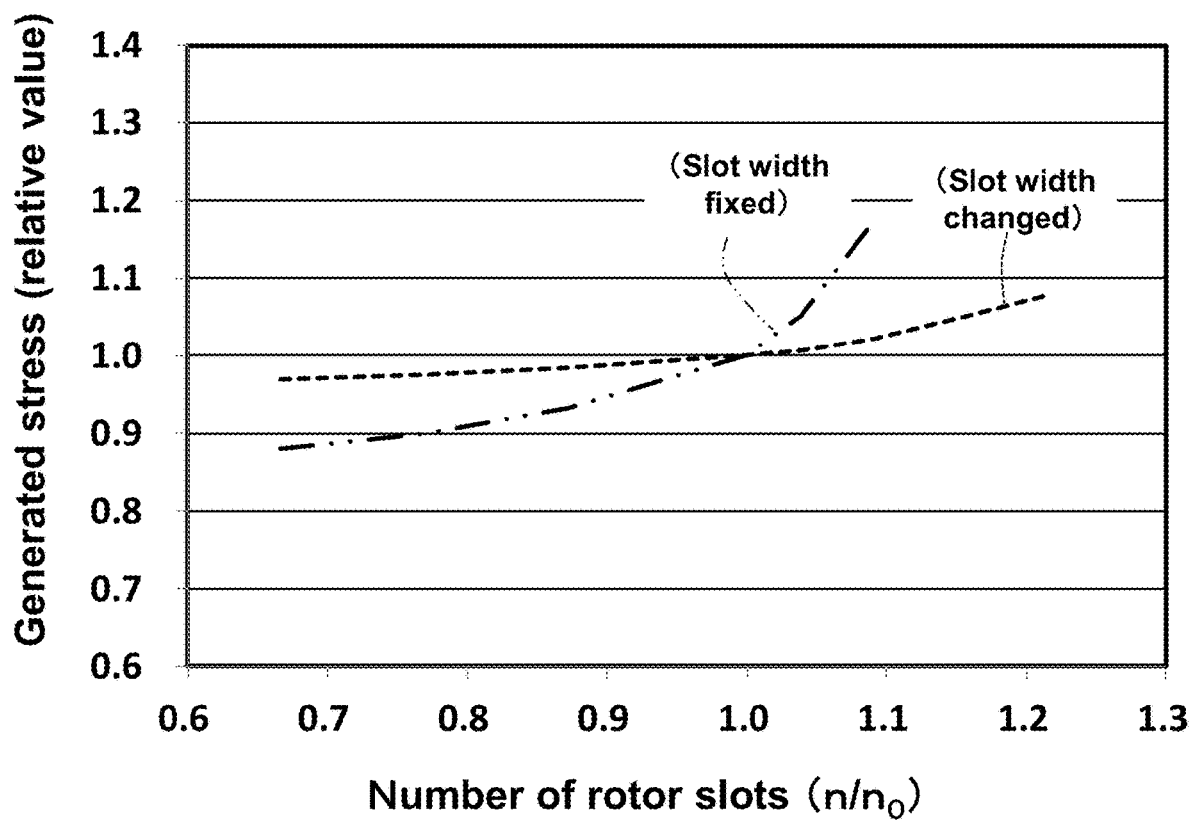
FIG. 4 is a graph illustrating an example of estimation of the relationship between the number of the rotor slots and a generated stress in the solid rotor of the squirrel-cage induction rotating electrical machine according to the embodiment.

FIG. 4 is a graph illustrating an example of estimation of the relationship between the number of the rotor slots and a generated stress in the solid rotor of the squirrel-cage induction rotating electrical machine according to the embodiment. The horizontal axis represents the ratio of the number n of the rotor slots to the reference number $n_0$ of the rotor slots. The vertical axis represents the ratio (relative value) of a generated stress to that when the number of the rotor slots is the reference number $n_0$.

The dashed curve in the graph represents a case where a slot width d of the rotor slot 14 is changed in an inverse proportion to the number of rotor slots 14. The dashed double-dotted curve represents a case where the slot width d of the rotor slot 14 is fixed. The generated stress in this estimation is measured at the root of the rotor teeth 15, where it exhibits the maximum value in stress distribution.

As illustrated in FIG. 4, an increase in the number of the rotor slots 14 increases the stress. This is so even when the slot width d is reduced in accordance with the increase in the number of the rotor slots 14, although the degree of increase in the stress is reduced.

Figure 5:
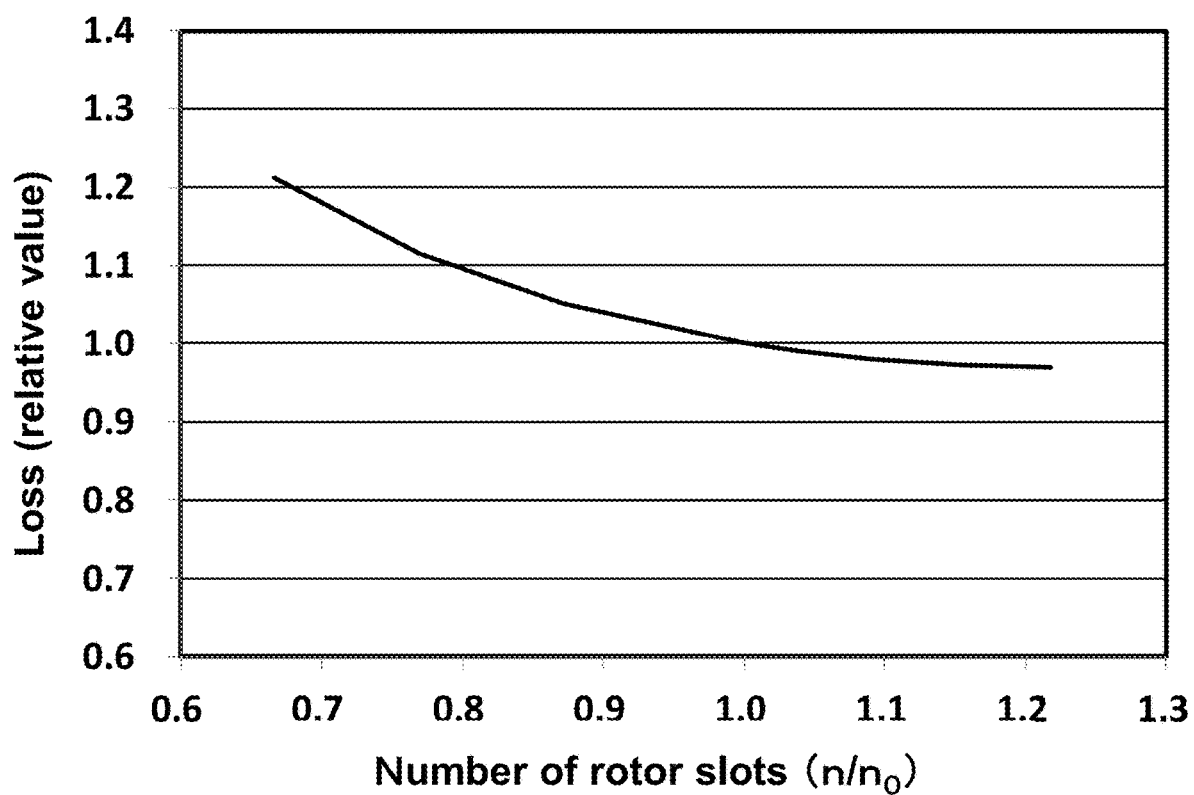
FIG. 5 is a graph illustrating an example of estimation of the relationship between the number of the rotor slots and a loss in the solid rotor of the squirrel-cage induction rotating electrical machine according to the embodiment.

FIG. 5 is a graph illustrating an example of estimation of the relationship between the number of the rotor slots and a loss in the solid rotor of the squirrel-cage induction rotating electrical machine according to the embodiment. The horizontal axis represents the ratio of the number n of the rotor slots to the reference number $n_0$ of the rotor slots. The vertical axis represents the ratio (relative value) of a loss to that when the number of the rotor slots is the reference number $n_0$.

As illustrated in FIG. 5, the loss decreases with an increase in the number of the rotor slots 14. This point will be supplemented below with reference to FIGS. 6 to 8.

Figure 6:
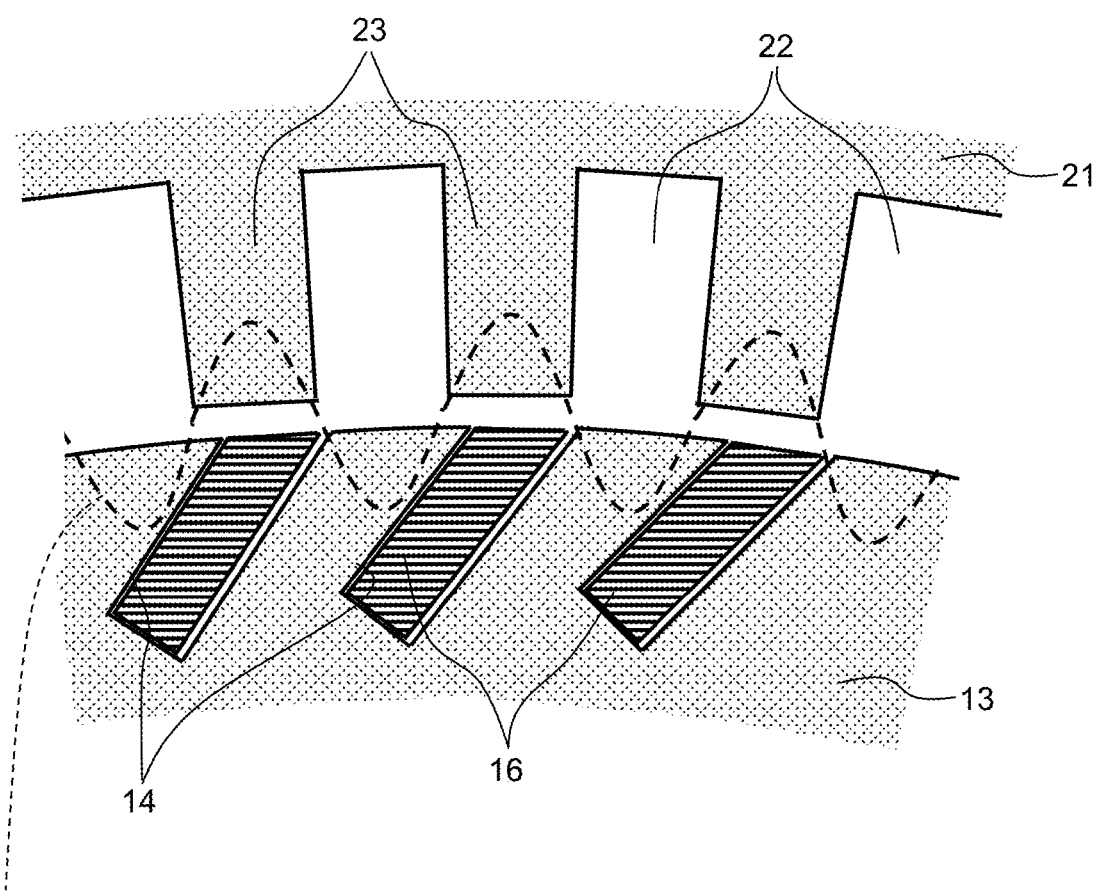
FIG. 6 is a first conceptual partial cross-sectional view of the relationship between the stator and the rotor slots of the squirrel-cage induction rotating electrical machine according to the embodiment.
Figure 7:
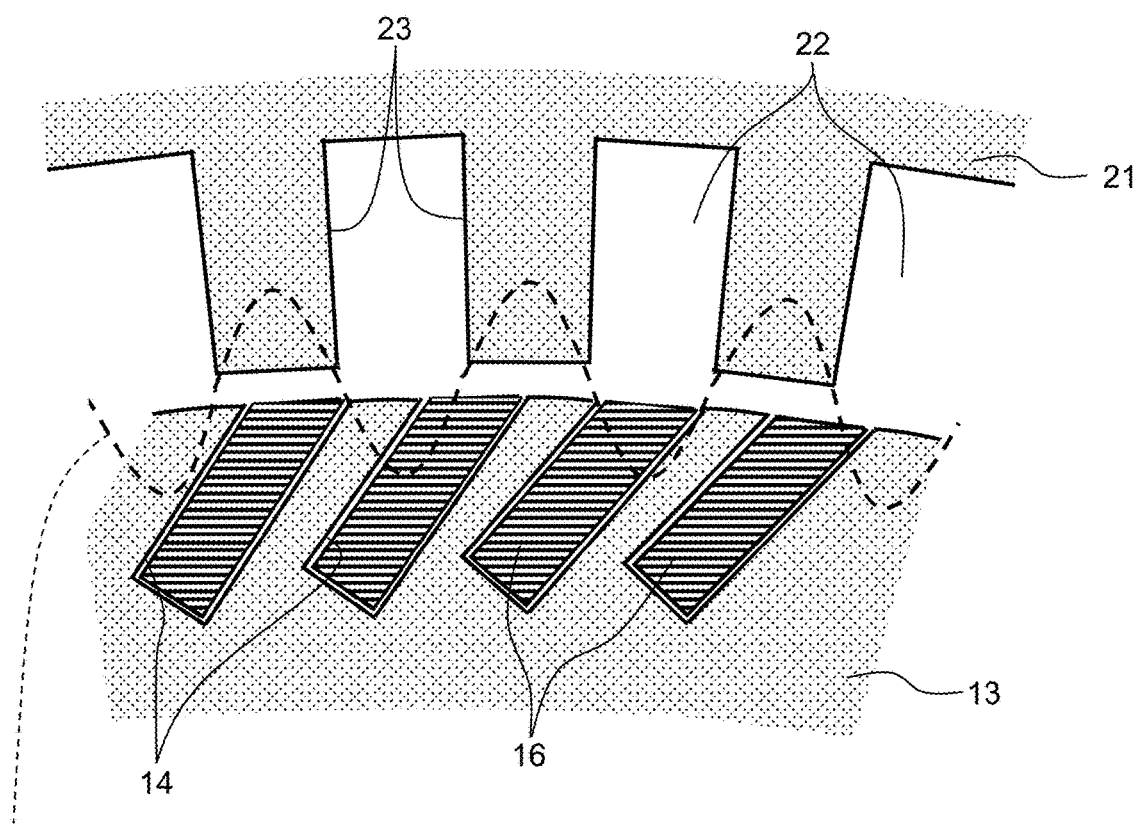
FIG. 7 is a second conceptual partial cross-sectional view of the relationship between the stator and the rotor slots of the squirrel-cage induction rotating electrical machine according to the embodiment.
Figure 8:
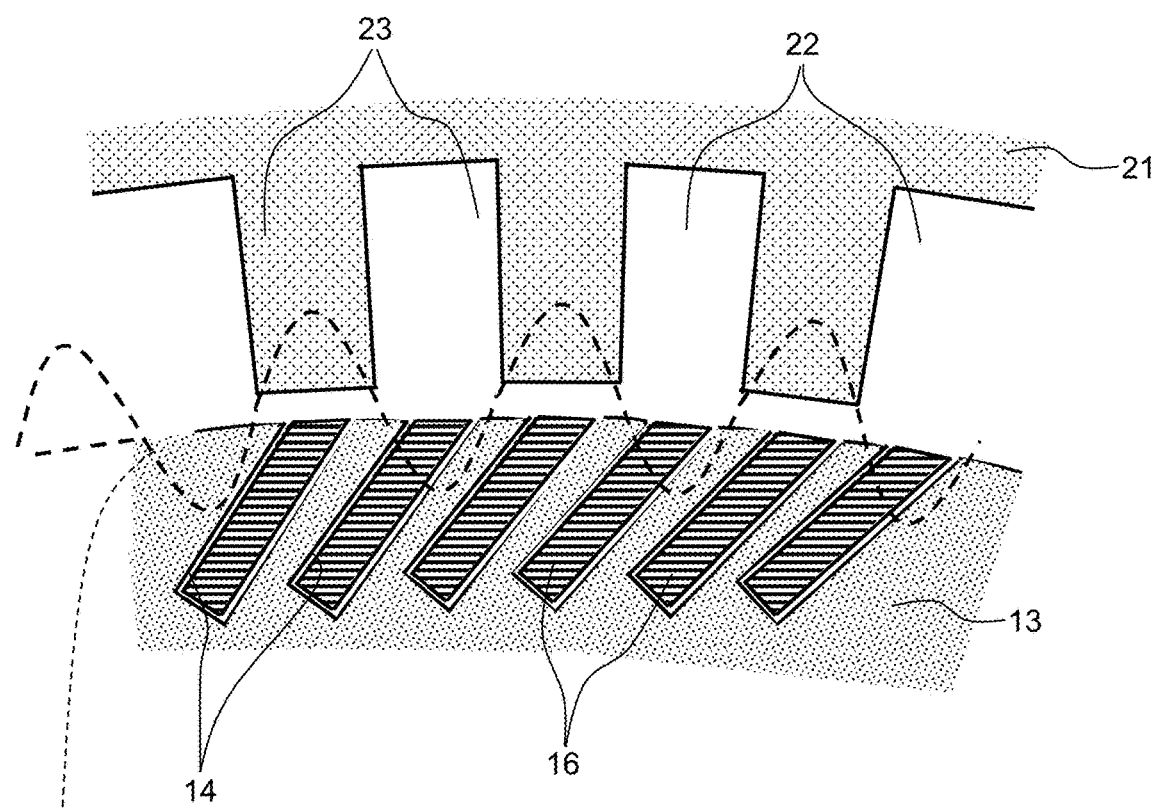
FIG. 8 is a third conceptual partial cross-sectional view of the relationship between the stator and the rotor slots of the squirrel-cage induction rotating electrical machine according to the embodiment.

FIG. 6 is a first conceptual partial cross-sectional view of the relationship between the stator and the rotor slots of the squirrel-cage induction rotating electrical machine according to the embodiment, and FIGS. 7 and 8 are respectively second and third conceptual partial cross-sectional views thereof. In all these graphs, the stator winding conductor 24a (FIG. 2) is not illustrated. Further, the dashed curve in each graph conceptually represents circumferential flux density distribution by the stator windings 24 (FIG. 1) at a certain moment.

The number of the rotor slots 14 is assumed to be n, and the number of the stator slots 22 is N. FIG. 6 illustrates a case where n is equal to N. The circumferential flux density distribution formed by current flowing through the stator winding 24 has a pitch, i.e., period of a phase corresponding to the distribution of the positions of the stator slots 22. Thus, when the circumferential flux density distribution denoted by the dashed wave of FIG. 6 is generated, magnetic flux does not penetrate the conductor bars 16.

When the number n of the rotor slots is smaller than the number N of the stator slots, a time period during which magnetic flux does not penetrate the conductor bars 16 increases. Thus, the magnetic flux formed by current flowing through the stator winding 24 does not penetrate the conductor bars 16 to be leakage magnetic flux, leading to deterioration in induction motor efficiency.

The second conceptual view of FIG. 7 illustrates a case where the number n of the rotor slots is larger than the number N of the stator slots. In this case, the arrangement pitch of the rotor slots 14 differs from the period, i.e., phase pitch of the circumferential flux density distribution formed by current flowing through the stator winding 24. Therefore, the magnetic flux penetrates the conductor bars 16 without fail. In this case, a part of the magnetic flux penetrates any of the conductor bars 16. A part of the magnetic flux that does not penetrate the conductor bars 16 becomes leakage magnetic flux.

The third conceptual view of FIG. 8 illustrates a case where the number n of the rotor slots is further increased to be twice the number N of the stator slots. In this case, the magnetic flux penetrates any of the conductor bars 16 at any phase, and the amount of leakage magnetic flux is smaller than that in the cases of the first and second conceptual views, thus minimizing a magnetic loss.

Thus, as the number n of the rotor slots 14 is increased from being equal to the number N of the stator slots 22 to being twice the number N, the magnetic flux generated by the stator winding 24 (FIG. 1) and the conductor bars 16 of the solid rotor 10 may be coupled to each other more strongly. This is a factor that reduces the loss.

Thus, from the viewpoint of the loss, the number n of the rotor slots is preferably larger than the number N of the stator slots. Specifically, establishing the following equation (1) is required.

$$n/N \geq 1.1 \quad (1)$$

Figure 9:
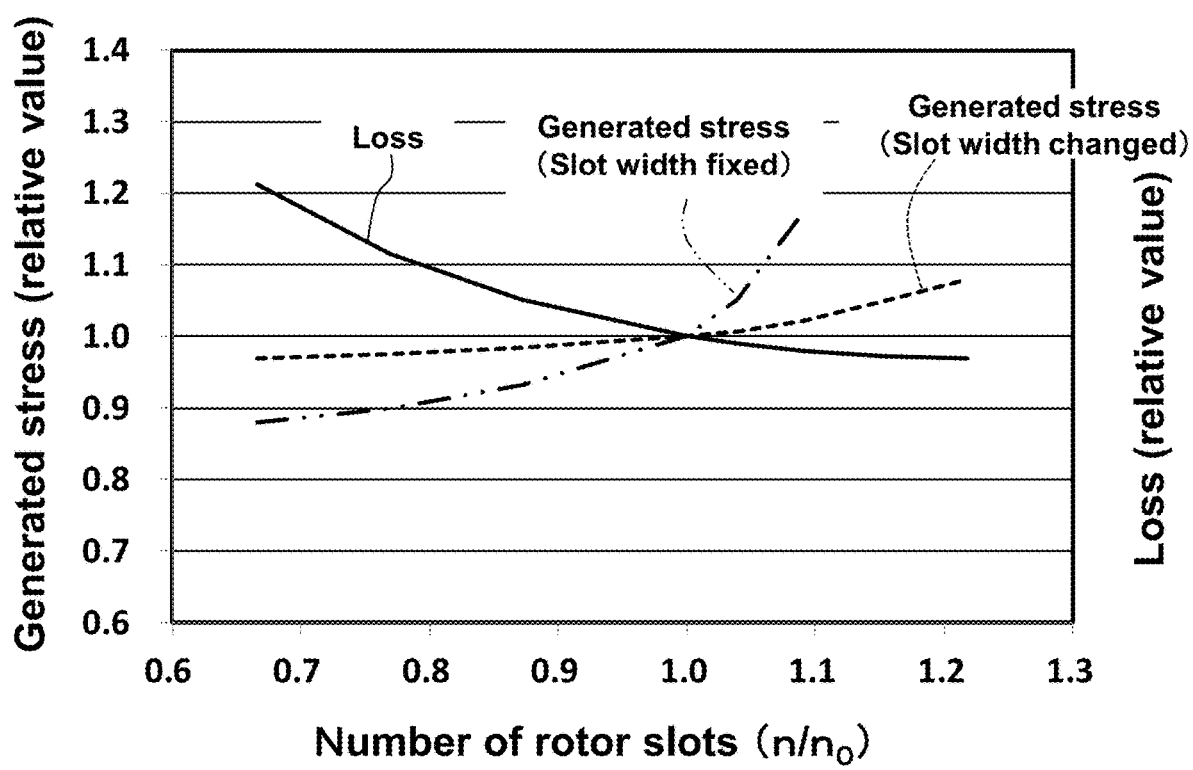
FIG. 9 is a graph illustrating an example of estimation of the relationship between the number of the rotor slots and the loss in the solid rotor of the squirrel-cage induction rotating electrical machine according to the embodiment.

FIG. 9 is a graph illustrating an example of estimation of the relationship between the number of the rotor slots and the loss in the solid rotor of the squirrel-cage induction rotating electrical machine according to the embodiment. That is, FIG. 9 combines the graphs of FIGS. 4 and 5 into one graph. The horizontal axis represents the ratio of the number n of the rotor slots to the reference number $n_0$ of the rotor slots. The vertical axis represents the ratio (relative value) of the generated stress to that when the number of the rotor slots is the reference number $n_0$ of the rotor slots and the ratio (relative value) of the loss to that when the number of the rotor slots is the reference number $n_0$.

The solid curve represents the loss, and the dashed curve represents the generated loss obtained under a condition where the slot width is changed (reduced) and dashed double-dotted curve represents the generated stress obtained under a condition where the slot width is fixed.

As the number of the rotor slots 14 increases, the generated stress tends to increase, whereas the loss tends to decrease. That is, the generated stress and the loss exhibit reverse increase/decrease tendency with respect to the increase in the number of rotor slots 14.

Although the generated stress and the generated loss are mutually different characteristic values, they are common in being a drawback factor. Thus, the two drawback factors are evaluated according to a common criterion, and a negative drawback is minimized as a whole.

The generated stress and the generated loss when the number of the rotor slots is $n_0$ are assumed to be $S_0$ and $L_0$, respectively. The $n_0$ may have any value.

The generated stress and the generated loss in the case that the number of the rotor slots is n are assumed to be S(n) and L(n), respectively. In this case, by minimizing a first evaluation function PIn(n) represented by the following equation (2) for n, it is possible to determine the number of the rotor slots that minimizes the generated stress and the generated loss as a whole.

$$PIn(n) = [S(n)/S_0] + p \cdot [L(n)/L_0] \quad (2)$$

Alternatively, the first evaluation function PIn(n) may be represented by the following equation (3).

$$PIn(n) = [S(n)/S_0] \cdot [L(n)/L_0]^p \quad (3)$$

In the above equations (2) and (3), $S_0$ and $L_0$ each are any reference value. The constant p is a value for reflecting the weights of both disadvantages brought about by the generated stress S(n) and by the generated loss L(n) and is set considering, for example, the use purpose of a target rotating electrical machine or a design margin.

Thus, in the evaluation for the number n of the rotor slots as a first step, a specific value that minimizes the above equation (2) or (3) is determined. In this case, considering a determination process of the rotor slot tilt angle Φ in the subsequent second step, the number of the rotor slots satisfying the optimum combination of the number n of the rotor slots and the rotor slot tilt angle Φ cannot necessarily be obtained. Thus, the number n of the rotor slots needs to be selected with a sufficient range.

Figure 10:
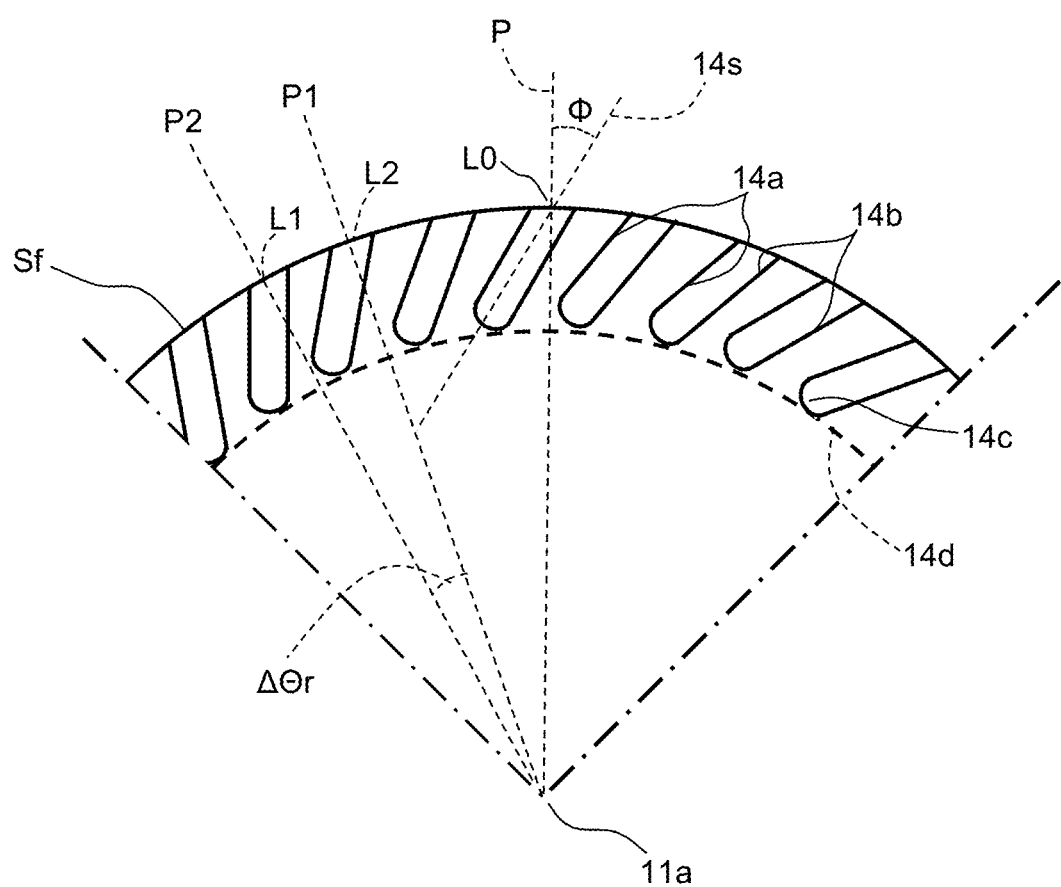
FIG. 10 is a partial cross-sectional view for explaining the rotor slot tilt angle of the solid rotor according to the embodiment.

FIG. 10 is a partial cross-sectional view for explaining the rotor slot tilt angle of the solid rotor according to the embodiment. Here, assumed is a virtual plane 14s positioned at the center between the outer wall 14a and the inner wall 14b, which are mutually opposing and mutually parallel, of one rotor slot 14. The radial surface of the rotor core part 13 is defined as a curved surface Sf. The intersection line between the curved surface Sf and the virtual plane 14s is defined as an intersection line L0. The plane passing the rotation center axis 11a and intersection line L0 is defined as a plane P.

Thus, the two planes, i.e., the virtual plane 14s and the plane P pass the intersection line L0. The circumferential intersection angle formed by the two planes is defined as the rotor slot tilt angle Φ (0°<rotor slot tilt angle Φ<90°). Further, the angle formed by planes P1 and P2 passing through adjacent intersection lines L1 and L2, respectively, is defined as a pitch angle Δθr (0°<pitch angle Δθr<90°).

Figure 11:
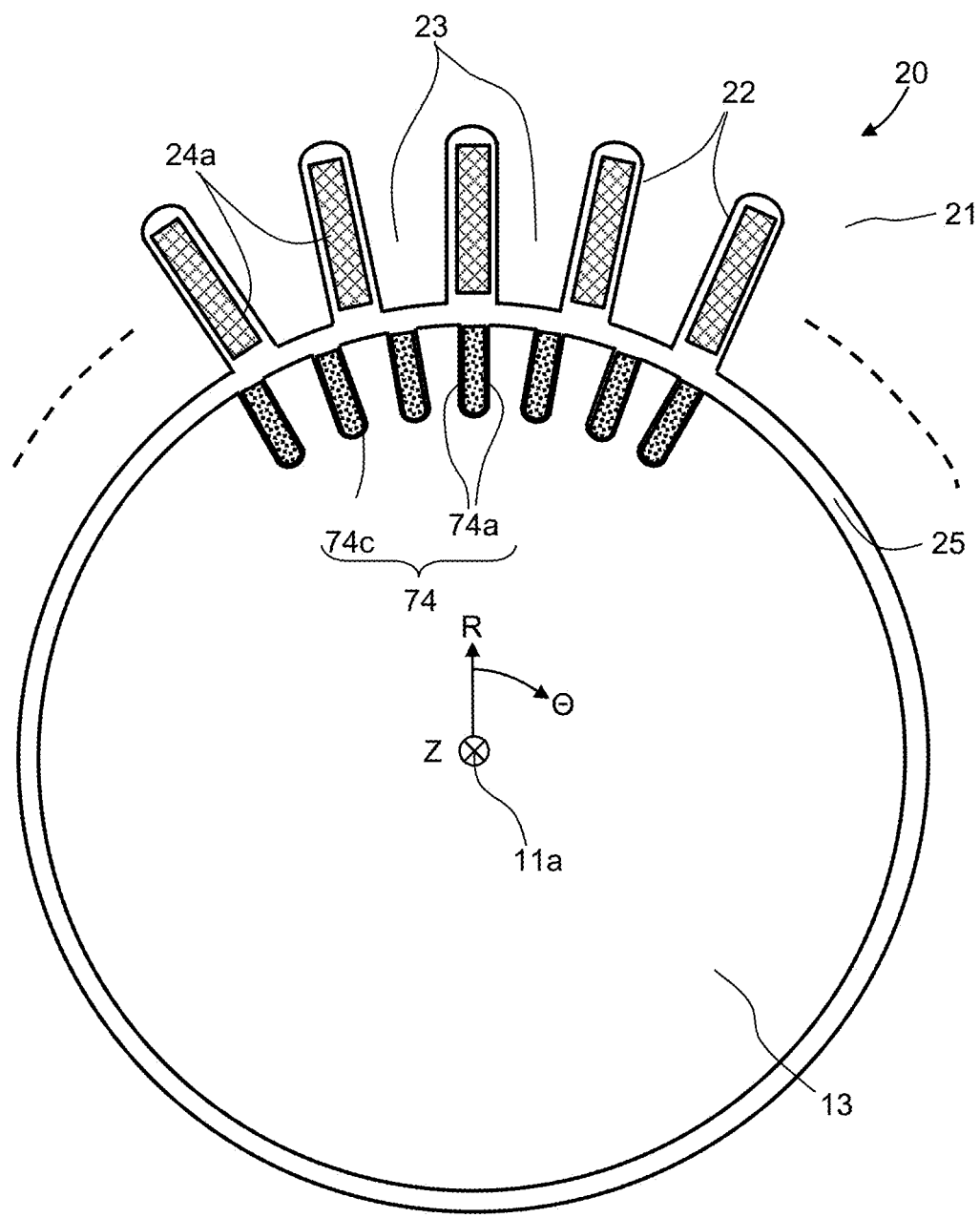
FIG. 11 is a cross-sectional view illustrating the solid rotor and stator slots when the rotor slot tilt angle of the solid rotor according to the embodiment is zero.

FIG. 11 is a cross-sectional view illustrating the solid rotor and stator slots when the rotor slot tilt angle of the solid rotor according to the embodiment is zero. That is, FIG. 11 illustrates a conventionally configured rotor slots 74. The center plane between two mutually parallel opposing walls 74a of the rotor slot 74 passes the rotation center axis 11a, and an innermost part 74c is positioned closer to the rotation center axis 11a (i.e., formed deeper) than in the present embodiment. The virtual plane 14s and the plane P, which cross each other in the configuration illustrated in FIG. 10, coincide with each other in the configuration of FIG. 11 and, in this case, the rotor slot tilt angle Φ defined in a similar manner as in FIG. 10 is 0°.

Thus, in the solid rotor 10 of the squirrel-cage induction rotating electrical machine 100 according to the present embodiment, the rotor slot 14 formed in the surface of the rotor core part 13 of the solid rotor 10 is circumferentially tilted. Further, the ratio of the number of the rotor slots 14 to the number of the stator slots 22 is larger than 1.1.

Figure 12:
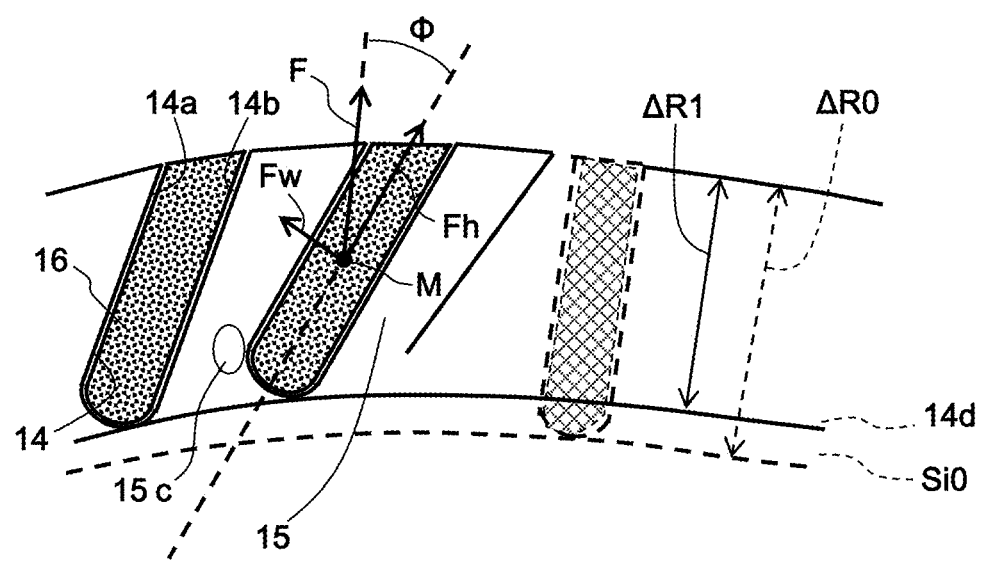
FIG. 12 is a conceptual partial cross-sectional view for explaining the effect of the solid rotor of the squirrel-cage induction rotating electrical machine according to the embodiment.

FIG. 12 is a conceptual partial cross-sectional view for explaining the effect of the solid rotor of the squirrel-cage induction rotating electrical machine according to the embodiment. The two left side rotor slots in the drawing are the rotor slots 14 of the rotor core part 13 according to the present embodiment and the conductor bars 16 passing therethrough. For comparison, a conventional rotor slot and a conductor bar having the same cross-sectional area as that of the conductor bar according to the present embodiment are denoted by the thick and thin dashed lines, respectively.

The radius of the inscribed circle 14d of the rotor slots 14 in the present embodiment is larger than the radius of an inscribed circle Si0 of the conventional rotor slots. That is, a radial width ΔR1 of the rotor slot 14 according to the present embodiment is smaller than a radial width ΔR0 of the conventional rotor slot. Thus, for example, the center position of each conductor bar 16 is closer to the surface of the rotor core part 13, and the distance between the overall position (including the center position) of the conductor bar 16 and the stator windings 24 is smaller. The value of $\Delta R1$ is substantially $\Delta R0 \cdot \cos \Phi$.

An iron loss is typically generated in the rotor core part 13 having a lower conductivity than that of the conductor bar 16, and an induced current flows mainly on the surface of the rotor core part 13, so that the surface temperature of the rotor core part 13 tends to increase.

The relative reduction in the distance between the overall position of the conductor bar 16 and the stator windings 24 increases the coupling strength therebetween due to magnetic flux penetrating the stator core 21 and conductor bars 16, leading to improvement in efficiency. As a result, the loss is reduced. Thus, an increase in a surface temperature Ts of the rotor core part 13 according to the present embodiment is suppressed more than conventional type. The larger the rotor slot tilt angle $\Phi$, the higher this effect.

In order to reliably achieve this effect, it is considered necessary to reduce the ratio of the radial width of the rotor slots 14 by, for example, at least about 5% to 10%, although evaluation needs to be performed including the stator windings 24. In this case, the value of $\cos \Phi$ is 0.9 to 0.95; that is, $\Phi$ is 18° to 26°. Thus, it is considered that the rotor slot tilt angle $\Phi$ needs to be at least about 20°.

Further, it is considered that reduction of about 20% to about 30% makes the effect remarkable. In this case, according to the equation: $\Delta R1 = \Delta R0 \cos \Phi$, the value of $\cos \Phi$ is 0.7 to 0.8; that is, $\Phi$ is 37° to 46°. Thus, it is considered that the rotor slot tilt angle $\Phi$ is preferably about 40° to 45°.

In FIG. 12, a centrifugal force F at a barycenter M in the cross section of the conductor bar 16 is resolved into a component force Fh withdrawing the conductor bar 16 along the rotor slot 14 and a component force Fw being perpendicular to the component force Fh and acting on the outer wall 14a of the rotor slot 14.

The value of the component force Fh is $F \cos \Phi$, which is smaller than the value of the centrifugal force F. Thus, the value obtained by $(F - F \cos \Phi)$ serves as a margin for a coming-off prevention measure equivalent to that conventionally taken. Further, in some cases, a margin equivalent to that conventionally ensured is available in a coming-off measure such as brazing that does not require large-scale facilities as much as conventional measures such as pressing.

On the other hand, the value of the component force Fw acting on the outer wall 14a is $F \sin \Phi$, which bends the rotor teeth 15 in the circumferential direction so as to make the rotor teeth along the radial direction. In this case, in stress distribution for the rotor teeth 15, a maximum stress value Smax occurs at a root 15c of the rotor teeth 15. Thus, the rotor slot tilt angle is set such that the maximum stress value Smax falls within a value range sufficiently smaller than allowable stress.

Thus, in the solid rotor 10 according to the present embodiment, by circumferentially titing the rotor slot 14, it is possible to reduce the loss L which may cause an increase in the surface temperature of the rotor core part 13 while relaxing the condition concerning the coming-off of the conductor bar 16 from the rotor slot 14.

Further, as described using equation (3), efficiency is further improved by making the number of the rotor slots 14 larger than a value 1.1 times the number of the stator slots 22. Thus, an increase in the surface temperature Ts of the rotor core part 13 can be further suppressed.

Figure 13:
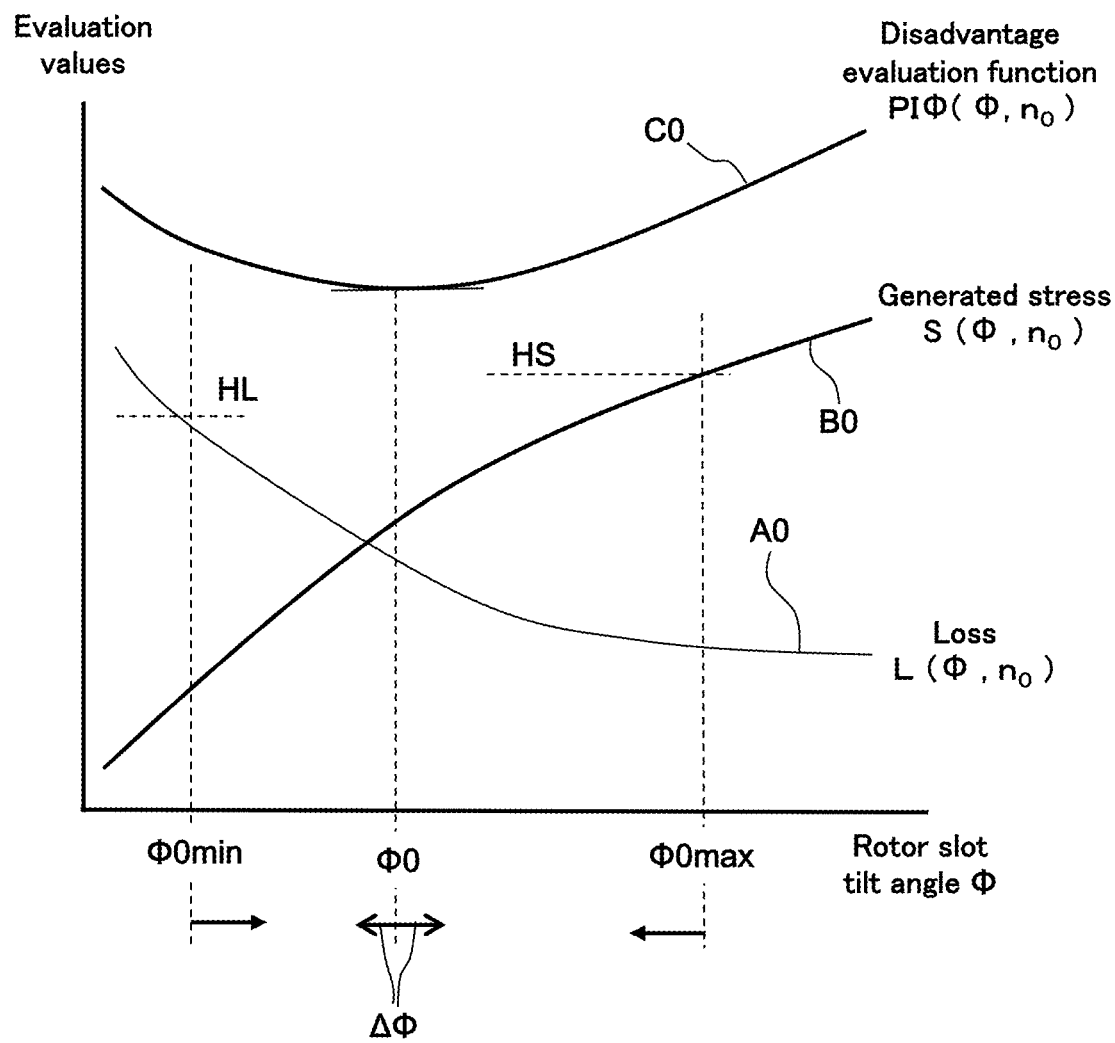
FIG. 13 is a conceptual graph for explaining the effect of the solid rotor of the squirrel-cage induction rotating electrical machine according to the embodiment, and further for explaining procedures for creating an allowance map and determining a rotor slot tilt angle and a rotor slot arrangement pitch in the design method for the squirrel-cage induction rotating electrical machine.

FIG. 13 is a conceptual graph for explaining the effect of the solid rotor of the squirrel-cage induction rotating electrical machine according to the embodiment, and this graph further explains procedures for creating an allowance map and determining a rotor slot tilt angle and a rotor slot arrangement pitch in the design method for the squirrel-cage induction rotating electrical machine. The horizontal axis represents the rotor slot tilt angle $\Phi$. The vertical axis represents evaluation values of the loss $L(\Phi, n_0)$ denoted by curve $\Delta\Phi$, the evaluation values of the generated stress $S(\Phi, n_0)$ denoted by curve BO, and function values of a disadvantage evaluation function $PI\Phi(\Phi, n_0)$ denoted by curve C0 combining the loss $L(\Phi, n_0)$ and generated stress $S(\Phi, n_0)$.

The generated stress $S(\Phi, n_0)$ and loss $L(\Phi, n_0)$ are values corresponding to the rotor slot tilt angle $\Phi$ when the number of rotor slots is $n_0$.

The disadvantage evaluation function $PI\Phi(\Phi, n_0)$ is represented by the following equation (4).

$$PI\Phi(\Phi, n_0) = g[S(\Phi, n_0), L(\Phi, n_0)] \quad (4)$$

$n_0$ is a value in the range of the numbers n of the rotor slots determined in the first step, i.e., the minimizing step (e.g., equation (2) or (3)) for the number n of the rotor slots and is used as a parameter. That is, in the present second step, i.e., a disadvantage evaluation function minimizing step with respect to the rotor slot tilt angle $\Phi$, $n_0$ is used as a constant value. As a result, it is possible to obtain a combination of (number $n_0$ of the rotor slots) and (rotor slot tilt angle $\Phi$) that minimizes the disadvantage evaluation function $PI\Phi(\Phi, n_0)$ with respect to each number $n_0$ of the rotor slots. Among these combinations, a combination that minimizes the value of the disadvantage evaluation function $PI\Phi(\Phi, n_0)$ includes the (number n of the rotor slots) and (rotor slot tilt angle $\Phi$) to be finally determined.

The disadvantage evaluation function $PI\Phi(\Phi, n_0)$ may be represented by the following equation (5).

$$PI\Phi(\Phi, n_0) = [S(\Phi, n_0)/S_0] + q \cdot [L(\Phi, n_0)/L_0] \quad (5)$$

The evaluation function PI (n) may be represented by the following equation (6).

$$PI\Phi(\Phi, n_0) = [S(\Phi, n_0)/S_0] \cdot [L(\Phi, n_0)/L_0]^q \quad (6)$$

$S_0$ and $L_0$ each are any reference value. The constant q is a value for reflecting the weights of both disadvantages brought about by the generated stress S(n) and the generated loss L(n), like the constant p in the first step, and is set considering, for example, the use purpose of a target rotating electrical machine or a design margin.

The equations (2) and (3) in the first step and equations (5) and (6) in the second step are illustrative and not restrictive. That is, when there is any other index that is subjected to the influence of the rotor slot tilt angle $\Phi$, it may be added as a variable to the above-described equations. Further, when influence on a given index is negligible, this index may be excluded from the equation (1). Further, a function different from that described above may be used.

As illustrated in FIG. 13, as the rotor slot tilt angle $\Phi$ increases, the loss $L(\Phi, n_0)$ decreases. On the other hand, the force that acts on the outer wall 14a to bend the rotor teeth 15 along the circumferential direction becomes larger as the rotor slot tilt angle $\Phi$ increases, so that the generated stress $S(\Phi, n_0)$ increases as the rotor slot tilt angle $\Phi$ increases. As denoted by curve C0, the $PI\Phi(\Phi, n_0)$ once decreases and then increases with an increase in the rotor slot tilt angle $\Phi$ and has a minimum value.

Further, an upper limit value HL is provided for the value of the loss $L(\Phi, n_0)$ to restrict a range of the rotor slot tilt angle $\Phi$ such that $\Phi > \Phi0$ min ($\Phi0$ min is a value corresponding to the upper limit value HL) is satisfied. The upper limit value HL is set to, for example, a value of the loss L that provides a maximum temperature obtained by subtracting a predetermined margin from the upper limit of a temperature range in which operation of the rotor core part 13 can be maintained.

Further, an upper limit value HS is provided for the value of the generated stress $S(\Phi, n_0)$ to restrict a range of the rotor slot tilt angle $\Phi$ such that $\Phi<\Phi0$ max ($\Phi0$ max is a value corresponding to the upper limit value HS). The upper limit value HS is set to, for example, a value of the generated stress S obtained by subtracting a predetermined margin from an allowable stress for the material of the rotor core part 13.

When the $Pl\Phi(\Phi, n_0)$ has a minimum value at the rotor slot tilt angle $\Phi$ that satisfies the condition of $\Phi0$ min$<\Phi<\Phi0$ max, as denoted by solid curve C0 in the example of FIG. 13, a value of the rotor slot tilt angle $\Phi$ that provides the minimum value is determined. Then, a predetermined angle range $\Delta\Phi$ is given to the determined minimum value, and the range from ($\Phi0-\Delta\Phi$) to ($\Phi0+\Delta\Phi$) is determined as an optimum range. The angle range $\Delta\Phi$ may be set to about 5° to about 10° which is sufficiently larger than the manufacturing accuracy of the squirrel-cage induction rotating electrical machine 100 including formation of the rotor slot 14.

Thus, in the solid rotor 10 according to the present embodiment, by circumferentially tilting the rotor slot 14, it is possible to suppress an increase in the surface temperature Ts of the rotor core part 13 while relaxing the condition concerning the coming-off of the conductor bar 16 from the rotor slot 14. Further, efficiency is further improved by making the number of the rotor slots 14 larger than a value 1.1 times the number of the stator slots 22. Thus, an increase in the surface temperature Ts of the rotor core part 13 can be further suppressed.

Further, the number n of the rotor slots 14 and the tilt angle $\Phi$ of the rotor slot 14 can be optimally set based on the indices such as the generated stress $S(\Phi, n_0)$ and the generated loss $L(\Phi, n_0)$.

Thus, in the squirrel-cage induction rotating electrical machine 100 having the solid rotor 10, the conductor bars 16 are reliably prevented from coming off radially outward, and an increase in the surface temperature Ts of the rotor core part 13 is suppressed.

Other Embodiments

While certain embodiments of the present invention have been described, these embodiments have been presented by way of example only, and are not intended to limit the scope of the invention. In the above embodiments, though the totally-enclosed type machine with the cooler is exemplified, other types of machines will do, and machines without the cooler will do.

The embodiments can be practiced in other various forms, and various omissions, substitutions and changes may be made without departing from the scope of the invention. The embodiments and modifications thereof are included in the scope or spirit of the present invention and in the appended claims and their equivalents.

The invention claimed is:

1. A design method for a squirrel-cage induction rotating electrical machine provided with a solid rotor having a shaft part and a rotor core part which are integrally formed and a stator provided radially outside the rotor core part, comprising:
   a stator condition setting step of setting dimensions and arrangement pitch of a plurality of stator slots which are formed in a radially inner surface of the stator so as to be disposed with circumferential intervals therebetween and to extend axially;
   a rotor condition setting step of setting, after the stator condition setting step, dimensions and arrangement pitch of rotor slots which are formed in a radially outer surface of the rotor core part so as to be disposed with circumferential intervals therebetween and to penetrate axially the rotor core part;
   a tilt angle setting step of setting a circumferential tilt angle of the rotor slot after the rotor condition setting step;
   a stress calculation step of calculating stress of the rotor core part after the tilt angle setting step;
   a temperature calculation step of calculating temperature of the rotor core part after the tilt angle setting step;
   an angle range determination step of determining whether processing for examining the circumferential tilt angle of the rotor slot is completed over an entire examination target range of the rotor slot tilt angle and performing the tilt angle setting step and subsequent steps when the determination is negative;
   a pitch range determination step of determining whether processing for examining the arrangement pitch of the rotor slots is completed over an entire examination target range of the arrangement pitch of the rotor slots when the determination in the angle range determination step is positive and performing the rotor condition setting step and subsequent steps when the determination in this pitch range determination step is negative; and
   a determination step of determining the tilt angle and pitch of the rotor slots based on results of the stress calculation step and temperature calculation step when the determination in the pitch range determination step is positive.

* * * * *